United States Patent
Yeom

(10) Patent No.: US 8,139,604 B2
(45) Date of Patent: Mar. 20, 2012

(54) PROCESSING SESSION INITIATION PROTOCOL SIGNALING IN VOICE/DATA INTEGRATED SWITCHING SYSTEM

(75) Inventor: Eung-Moon Yeom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1114 days.

(21) Appl. No.: 11/051,331

(22) Filed: Feb. 7, 2005

(65) Prior Publication Data

US 2005/0175032 A1 Aug. 11, 2005

(30) Foreign Application Priority Data

Feb. 9, 2004 (KR) .................. 10-2004-0008492

(51) Int. Cl.
*H04M 7/00* (2006.01)
*H04L 12/66* (2006.01)
*H04J 3/16* (2006.01)
*H04J 3/22* (2006.01)

(52) U.S. Cl. ......... 370/466; 370/352; 370/467; 379/229

(58) Field of Classification Search ................ 370/352, 370/466; 379/229
See application file for complete search history.

(56) References Cited

U.S. PATENT DOCUMENTS

| | | | |
|---|---|---|---|
| 6,657,970 B1 * | 12/2003 | Buckingham et al. | 370/249 |
| 7,054,986 B2 * | 5/2006 | Zhao et al. | 710/310 |
| 7,457,627 B2 * | 11/2008 | Knaebchen et al. | 455/452.2 |
| 7,480,260 B1 * | 1/2009 | Vashisht et al. | 370/260 |
| 7,489,867 B1 * | 2/2009 | Viscardi et al. | 398/58 |
| 7,587,587 B2 * | 9/2009 | Buer et al. | 713/153 |
| 7,852,859 B2 * | 12/2010 | Wengrovitz et al. | 370/397 |
| 2003/0043992 A1 * | 3/2003 | Wengrovitz | 379/229 |
| 2003/0093703 A1 * | 5/2003 | Oliver et al. | 713/400 |
| 2004/0258050 A1 * | 12/2004 | Sylvain et al. | 370/352 |

FOREIGN PATENT DOCUMENTS

| | | | |
|---|---|---|---|
| GB | 2 408 411 | | 5/2005 |
| GB | 2408411 | * | 5/2005 |

OTHER PUBLICATIONS

British Office Action of the British Patent Application No. GB0502554.9, issued on Jun. 29, 2005.
Combined Search and Examination Report for corresponding Korean Patent Application No. 2004-8492, issued on Oct. 17, 2006.
www.sipcenter.com/sip.nsf/html/SIP+Signaling; SIPCenter, "What is SIP? Signaling/ About SIP/ SIP Signaling". Se description of INFO method under heading "SIP Methods", Dec. 1, 2006.

* cited by examiner

*Primary Examiner* — Ahmad Matar
*Assistant Examiner* — Nafiz E Hoque
(74) *Attorney, Agent, or Firm* — H.C. Park & Associates, PLC

(57) ABSTRACT

Processing Session Initiation Protocol (SIP) signaling in a voice/data integrated switching system includes: transceiving a message and data between a terminal and a system using a Voice over Internet Protocol (VoIP) SIP "INFO" method upon communication being performed between terminals via an Internet Protocol (IP)network and using a VoIP SIP "MESSAGE" method in an idle state upon communication not being performed between the terminals; processing proprietary signaling of a legacy voice switching system as standard signaling using standard VoIP SIP signaling, and simultaneously and separately processing the standard SIP signaling and the proprietary signaling of the legacy voice switching system in a system using the VoIP SIP signaling.

13 Claims, 7 Drawing Sheets

PROCESSING SESSION INITIATION PROTOCOL SIGNALING IN VOICE/DATA INTEGRATED SWITCHING SYSTEM

CLAIM OF PRIORITY

This application makes reference to, incorporates the same herein, and claims all benefits accruing under 35 U.S.C §119 from an application for APPARATUS AND METHOD FOR PROCESSING SESSION INITIATION PROTOCOL SIGNALING IN VOICE/DATA INTEGRATED SWITCHING SYSTEM earlier filed in the Korean Intellectual Property Office on Feb. 9, 2004 and there duly assigned Ser. No. 2004-8492.

BACKGROUND OF THE INVENTION

1. Field of the Invention

The present invention relates to processing Session Initiation Protocol (SIP) signaling in a voice/data integrated switching system, and more particularly, to processing SIP signaling in a voice/data integrated switching system, in which networking is realized by signaling using a Voice over Internet Protocol (VoIP) SIP between a voice data switching system and a terminal in a voice/data integrated switching system including a data switch module and a router in a private switch.

2. Description of the Related Art

Internet Protocol (IP) networks are improving performance and service due to a rapid spread of the Internet and requirements for a variety of services. Accordingly, requirements for more services are rising in the market.

Voice transmission using an IP network, together with data transmission, plays an important role in the IP network, and accordingly, there is a need for a variety of voice transmission functions. Furthermore, integration of an existing terminal communication and VoIP using a digital telephone and a single telephone is needed.

Therefore, there is a need for a terminal which can be used in the IP network and has the same shape and operation as existing digital telephones such that it meets various needs. An Internet phone was developed in response to this need.

In general, an Internet phone communicates with a switch using an ITU-T recommendation H.323 protocol. The H.323 protocol is used for multimedia communication such as voice, image and data.

An IP-based voice communication system includes a voice switch, a data switch and a router.

The data switch switches the voice data, converted into packet data in the voice switch, to the router. The data switch includes an Ethernet switch.

The router transmits the voice packet data, switched in the data switch, to the Internet network.

The voice switch includes: an office line match module to match with an office line, i.e., a Public Switched Telephone Network (PSTN); an extension subscriber match module to match with an extension subscriber terminal; a Time Division Multiplexing (TDM) switching module to respectively divide a plurality of voice signals into predetermined time slots, and to transmit the divided signals; a media gateway module to convert a Pulse Code Modulation (PCM) voice signal transmitted from the TDM switching module into voice packet data, and to convert the voice packet data received from the data switch into the PCM voice signal; and a control module to control each of the modules. The media gateway module, the TDM switching module, the extension subscriber module and the office line match module are connected to one another using a PCM serial bus, and the control module is connected to each of the modules using a Central Processing Unit (CPU) bus. That is, the media gateway module in the voice switch compresses an existing PCM converted voice signal into packets, transmits the packets to the data switch, and reversely restores the voice packets transmitted from the data switch into a PCM encoded voice signal.

That is, a voice switch, an external data switch, a separate media gateway module for interfacing the voice switch and the external data switch, and a router are needed to provide an IP-based voice communication service. Since the data switch and the router are independent pieces of equipment that, are separate from the voice switch, difficulties occur in operating and maintaining the equipment.

Also, since signaling between the existing voice switching system and the terminal is converted into an IP signal to be processed, a problem occurs in that a VoIP SIP process and an IP converted proprietary signaling process must be separated into two parts and performed separately.

Also, since the signaling between the voice switching system and the terminal can use proprietary signaling, it is difficult to provide a service connected with an existing standard SIP, and is not suitable for a communication network that evolves into an ALL IP-based Next generation Network (NgN).

SUMMARY OF THE INVENTION

It is, therefore, an object of the present invention to provide a voice/data integrated switching system, in which a router, a data switch and a voice switch device are integrated so that it is easy to install, operate and maintain the system integrally, and it is possible to use a conventional voice terminal or a public telephone network interface module, and it is possible to effect a voice communication over the Internet and various multimedia data services as well as an existing voice communication with a single piece of equipment.

It is another object of the present invention to provide an apparatus and method to process SIP signaling in a voice/data integrated switching system, where call signaling between the voice/data integrated switching system and the terminal is processed using standard VoIP SIP signaling, and a message periodically switched between the switch system and the terminal and a message switched on busy except for the call signaling are networked using a "MESSAGE" method and an "INFO" method of VoIP SIP signaling.

It is yet another object of the present invention to provide an apparatus and method to process SIP signaling in a voice/data integrated switching system, in which VoIP SIP signaling accepts functions of various communication switch systems already realized between a voice switching system and a terminal.

According to an aspect of the present invention, a method for processing session initiation protocol signaling in a voice switching system, in which call signaling is connected to a session initiation protocol supported Internet protocol terminal using the session initiation protocol signaling, messages except the call signaling that are switched with the Internet protocol terminal support proprietary signaling and a session initiation protocol-based message, and each signaling separately sets and processes an session initiation protocol signaling port.

According to another aspect of the present invention, a voice switching system comprising: a session initiation protocol supported Internet protocol terminal; and a session initiation protocol signaling process unit for connecting call signaling to the Internet protocol terminal using session initiation protocol signaling, allowing messages except the calling signaling that are switched with the Internet protocol terminal to support proprietary signaling and a session initiation protocol-based message, and allowing each signaling to separately set and process a session initiation protocol signaling port.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings, in which like reference symbols indicate the same or similar components, wherein.

DETAILED DESCRIPTION OF THE INVENTION

Figure 1:
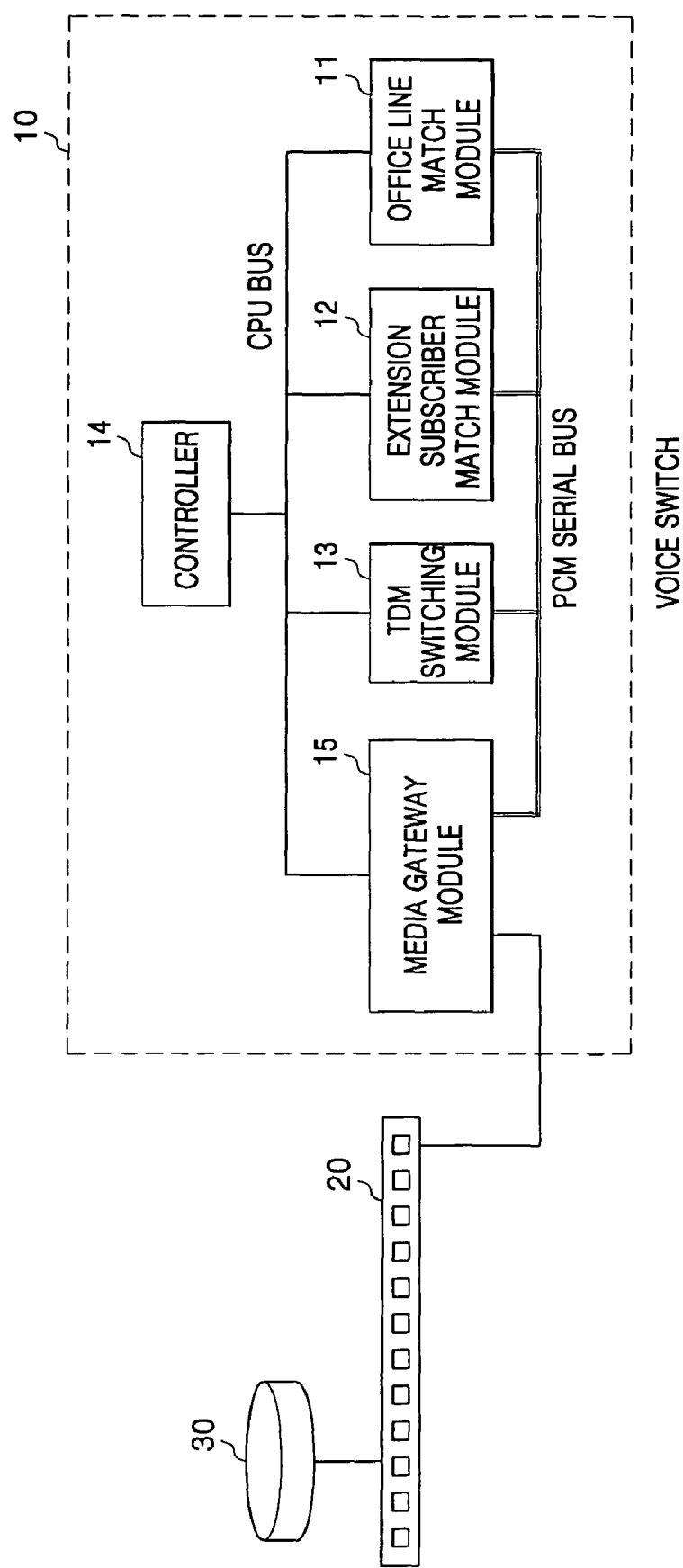
FIG. 1 is a block diagram of an Ethernet switch and a voice private switch in an IP-based voice communication system.

FIG. 1 is a block diagram of an Ethernet switch and a voice private switch in an IP-based voice communication system.

Referring to FIG. 1, the IP-based voice communication system includes a voice switch 10, a data switch 20 and a router 30.

The data switch 20 switches the voice data, converted into packet data in the voice switch 10, to the router 30. The data switch includes an Ethernet switch.

The router 30 transmits the voice packet data, switched in the data switch 20, to the Internet network.

The voice switch 10 includes: an office line match module 11 to match with an office line, i.e., a Public Switched Telephone Network (PSTN); an extension subscriber match module 12 to match with an extension subscriber terminal; a Time Division Multiplexing (TDM) switching module 13 to respectively divide a plurality of voice signals into predetermined time slots, and to transmit the divided signals; a media gateway module 15 to convert a Pulse Code Modulation (PCM) voice signal transmitted from the TDM switching module 13 into voice packet data, and to convert the voice packet data received from the data switch 20 into the PCM voice signal; and a control module 14 to control each of the modules. The media gateway module 15, the TDM switching module 13, the extension subscriber module 12 and the office line match module 11 are connected to one another using a PCM serial bus, and the control module 14 is connected to each of the modules 11, 12, 13 and 15 using a Central Processing Unit (CPU) bus. That is, the media gateway module 15 in the voice switch 10 compresses an existing PCM converted voice signal into packets, transmits the packets to the data switch 20, and reversely restores the voice packets transmitted from the data switch 20 to a PCM encoded voice signal.

That is, up to now, as shown in FIG. 1, a voice switch 10, an external data switch 20, a separate media gateway module 15 for interfacing the voice switch 10 and the external data switch 20, and a router 30 are needed to provide an IP-based voice communication service. Since the data switch 20 and the router 30 are independent pieces of equipment that are separate from the voice switch 10, difficulties occur in operating and maintaining the equipment.

Also, since signaling between the existing voice switching system and the terminal is converted into an IP signal to be processed, a problem occurs in that a VoIP SIP process and an IP converted proprietary signaling process must be separated into two parts and performed separately.

Also, since the signaling between the voice switching system and the terminal can use proprietary signaling, there occurs a difficulty in providing a service connected with an existing standard SIP, and a problem that it is not suitable for the communication network that evolves into an ALL IP-based Next generation Network (NgN).

The present invention will now be described more fully hereinafter with reference to the accompanying drawings, in which exemplary embodiments of the present invention are shown. The present invention can, however, be embodied in different forms and should not be construed, as being limited to the embodiments set forth herein. Rather, these embodiments are provided so that this disclosure will be thorough and complete, and will fully convey the scope of the present invention to those skilled in the art. In the drawings, like numbers refer to like elements throughout the specification.

Hereinafter, exemplary embodiments of an apparatus and a method of processing an SIP signaling in a voice/data integrated switching system will be described with reference to the accompanying drawings.

Figure 2:
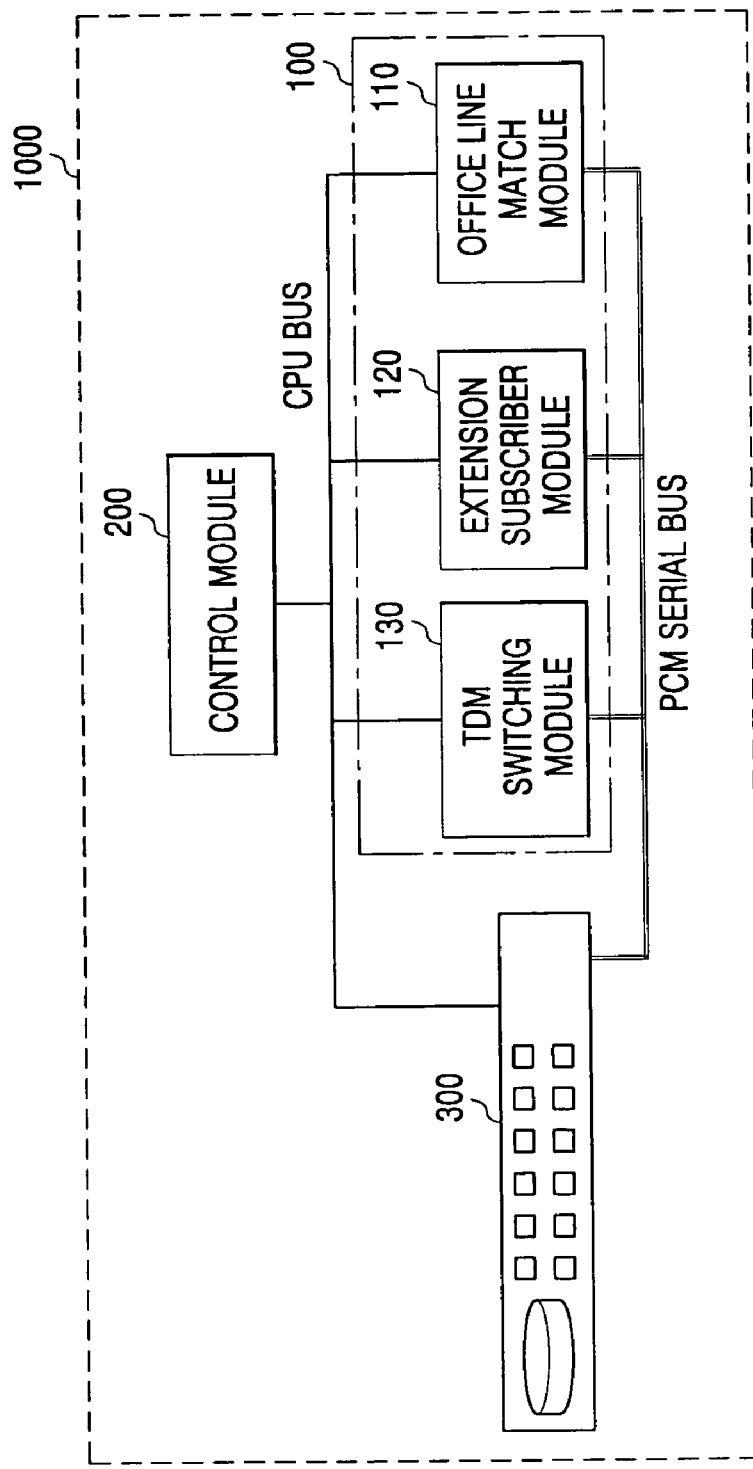
FIG. 2 is a block diagram of a voice/data integrated switching system in accordance with an embodiment of the present invention.

FIG. 2 is a block diagram of a voice/data integrated switching system in accordance with an embodiment of the present invention.

Referring to FIG. 2, a voice/data integrated switching system 1000 in accordance with an embodiment of the present invention includes: a subscriber trunk card 100 having an office line matching module 110, an extension subscriber module 120 and a TDM switching module 130, a control module 200, and a voice/data process module 300.

The voice/data processing module 300 is a module in which the router, the data switch, and the media gateway module in the voice switch of in FIG. 1 are integrated as one element of the voice/data integrated switching system.

That is, as shown in FIG. 2, the externally located router and data switch are installed in the voice switch, and a voice compression codec function that was performed in the media gateway module is performed in a single module, unlike the system of FIG. 1.

Construction and operation of the voice/data processing module 300 in accordance with the present invention will be described in detail with reference to FIG. 3, wherein the module 300 includes the router, the data switch and the media gateway module.

Figure 3:
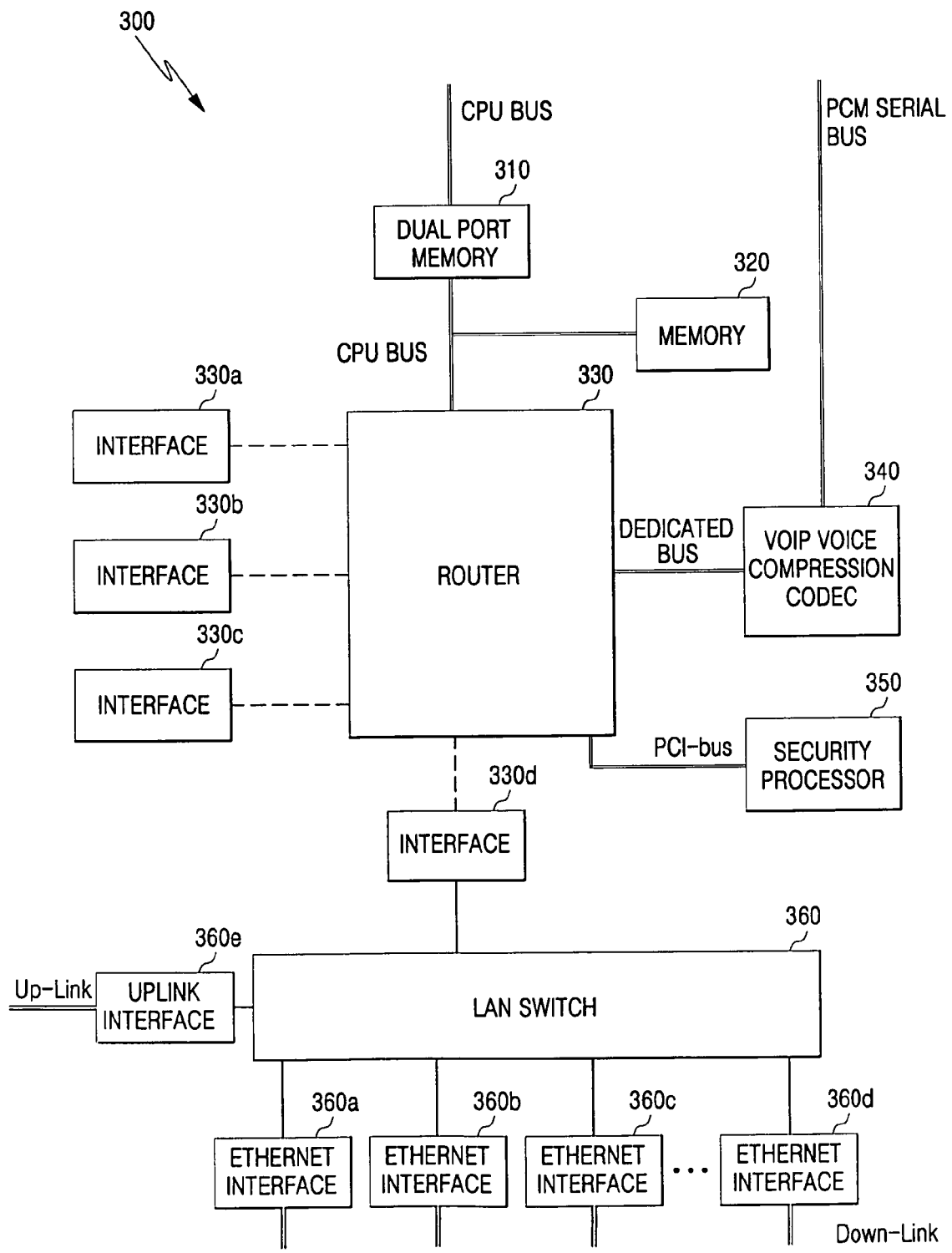
FIG. 3 is a block diagram of a voice/data processing module in the voice/data integrated switching system of FIG. 2.

FIG. 3 is a block diagram of a voice/data processing module in the voice/data integrated switching system of FIG. 2.

Referring to FIG. 3, a voice/data processing module 300 includes a dual port memory 310, a memory 320, a router 330, a VoIP voice compression codec 340, a security processor 350, and a local area network (LAN) switch 360.

The dual port memory 310 stores a signaling message through a first port from the control module 200 of FIG. 2, and reads the signaling message stored in the dual port memory 310 from the router 330 through a second port.

The memory 320 includes a Random Access Memory (RAM) and a flash memory, and stores various databases including programs for driving the router 330, routing information, subscriber information, and the like.

The router 330 transmits voice data packets to the Internet through interfaces 330a to 330c, and provides voice data packets to the LAN switch 360 through an interface 330d to be transmitted to the IP network.

Also, the router 330 provides a VoIP voice compression codec 340 with the voice data packets received from the interfaces 330a to 330d. As a result, the router 330 controls routing and switching of the voice data packets.

The router 330 is connected to plural interfaces 330a to 330d. The interface 330a includes the V.35 transceiver, which transceives the data packets through a Wide Area Network (WAN) serial port, and the interfaces 330b and 330c transceive the data packets through a Digital Subscriber Line (xDSL) or a cable modem.

Also, the interface 330d provides the LAN switch 360 with a path of the data packet, which can further include a Demilitarized Zone (DMZ) interface to connect to a server for providing a web page or an E-mail server although it is not shown in the figure.

The VoIP voice compression codec 340 converts a PCM coded voice signal from the TDM switching module 130 of FIG. 2 via a PCM serial bus into IP voice data packets, compresses the converted data packets, and transmits the compressed data packets to the IP network via the router 330. Also, the VoIP voice compression codec 340 converts the voice data packets received via the IP network into a PCM voice signal and provides the TDM switch module 130 of FIG. 2 with the converted signal via the PCM serial bus.

The security processor 350 is connected to the router 330 via the Peripheral Component Interconnect (PCI) bus, which performs a tunneling function in hardware through encryption, decryption and authentication that are needed to effect a virtual private LAN. That is, the Virtual Private LAN (VPN) is configured such that the transceived voice/data packet is encapsulated or decapsulated to perform the encryption or decryption.

The LAN switch 360 transmits the voice data packet transmitted from the router 330 via the interface 330d to the corresponding terminal via the interfaces 360a to 360d corresponding to a destination terminal. The interfaces 360a to 360d are connected to terminals, wherein the terminals can include a Personal Computer (PC), an IP phone, and the like, and the interfaces 360a to 360d are Ethernet interfaces.

Also, the LAN switch 360 provides the router 330 with the voice/data packet transmitted from the terminals via the interfaces 360a to 360d, via the interface 330d. Accordingly, the router 330 provides the VoIP voice compression codec 340 with the received voice/data packet. The LAN switch 360 is also connected to an uplink interface 360e used to transceive the voice/data packet to or from an uplink (for example, 100M/1 G).

A description follows as to the operation of the voice/data integrated switching system described above.

First, a signaling message for an incoming IP voice call is provided to the router 330 via the LAN switch 360, and the router 330 converts the signaling message for the received IP voice call into a message for processing an existing voice call and transmits the message to the control module 200 of FIG. 2 via the dual port memory 310.

A signaling message for processing an originating IP voice call is provided from the control module 200 of FIG. 2 to the router 330 via the dual port memory 310 of the voice/data processing module 300 of FIG. 3, and the router 330 converts the signaling message for processing the received IP voice call into IP message packets and provides the terminal connected to the IP network with the converted packets via the LAN switch 360.

Also, an IP voice packet inputted via the interfaces 360a to 360d is provided to the router 330 via the LAN switch 360, and the IP voice data packets inputted to the interfaces 330a to 330d via a WAN, an xDSL or a cable modem are also provided to the router 330.

The router 330 provides the VoIP voice compression codec 340 with the received IP voice data packet via a dedicated bus.

The VoIP voice compression codec 340 converts the IP voice data packets provided by the router 330 into a PCM coded voice signal, and provides the TDM switch module 130 of FIG. 2 with the PCM coded voice signal via the PCM serial bus.

On the contrary, the VoIP voice compression codec 340 converts the PCM coded voice signal transmitted from the TDM switching module of FIG. 2 via the PCM serial bus into IP voice packets, and then outputs the IP voice packets to router 330 via a dedicated bus.

The router 330 provides the LAN switch 360 with the IP voice packets from the VoIP voice compression codec 340 via the dedicated bus, and the LAN switch 360 transmits the IP voice packets from the router 330 to an address of the corresponding terminal via the interfaces 330a to 330d.

The IP packets inputted via the same interfaces 330a to 330c of FIG. 3, that is, a WAN serial port, or an xDSL modem or a cable modem, are provided to the router 330 via the interfaces 330a to 330c.

Accordingly, the router 330 retransmits the IP packets inputted via the interfaces 330a to 330c to the outside via the interfaces 330a to 330c, that is, the WAN serial port or xDSL modem, or the cable modem according to the corresponding IP address, or transmits the IP packets to the corresponding terminal via the LAN switch 360.

Also, the security processor 350 connected to the router 330 through a PCI-bus can prevents performance deterioration of all modules by performing in hardware a tunneling function through encryption, decryption and authentication of data that is needed to effect the virtual private LAN.

Figure 4:
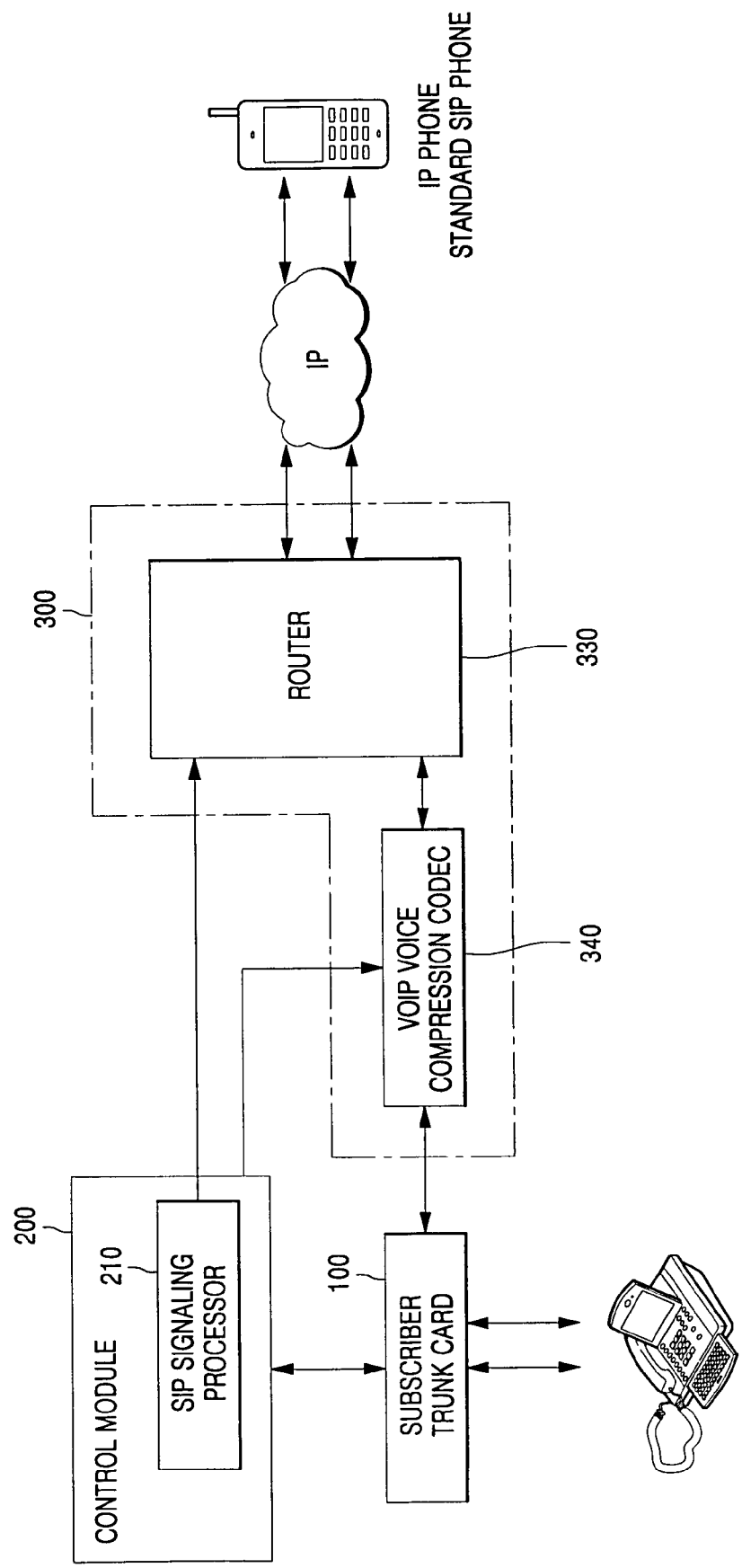
FIG. 4 is a block diagram of an apparatus to process SIP signaling in a voice/data integrated switching system in accordance with an embodiment of the present invention.

FIG. 4 is a block diagram of an apparatus to process SIP signaling in a voice/data integrated switching system in accordance with an embodiment of the present invention.

As shown in FIG. 4, the voice/data integrated switching system includes an SIP ignal processor 210 in the control module 200 to process call signaling between the voice/data integrated switching system and the terminal via an IP network using standard VoIP SIP signaling. The terminal can include an IP terminal or a standard SIP terminal.

Figure 5:
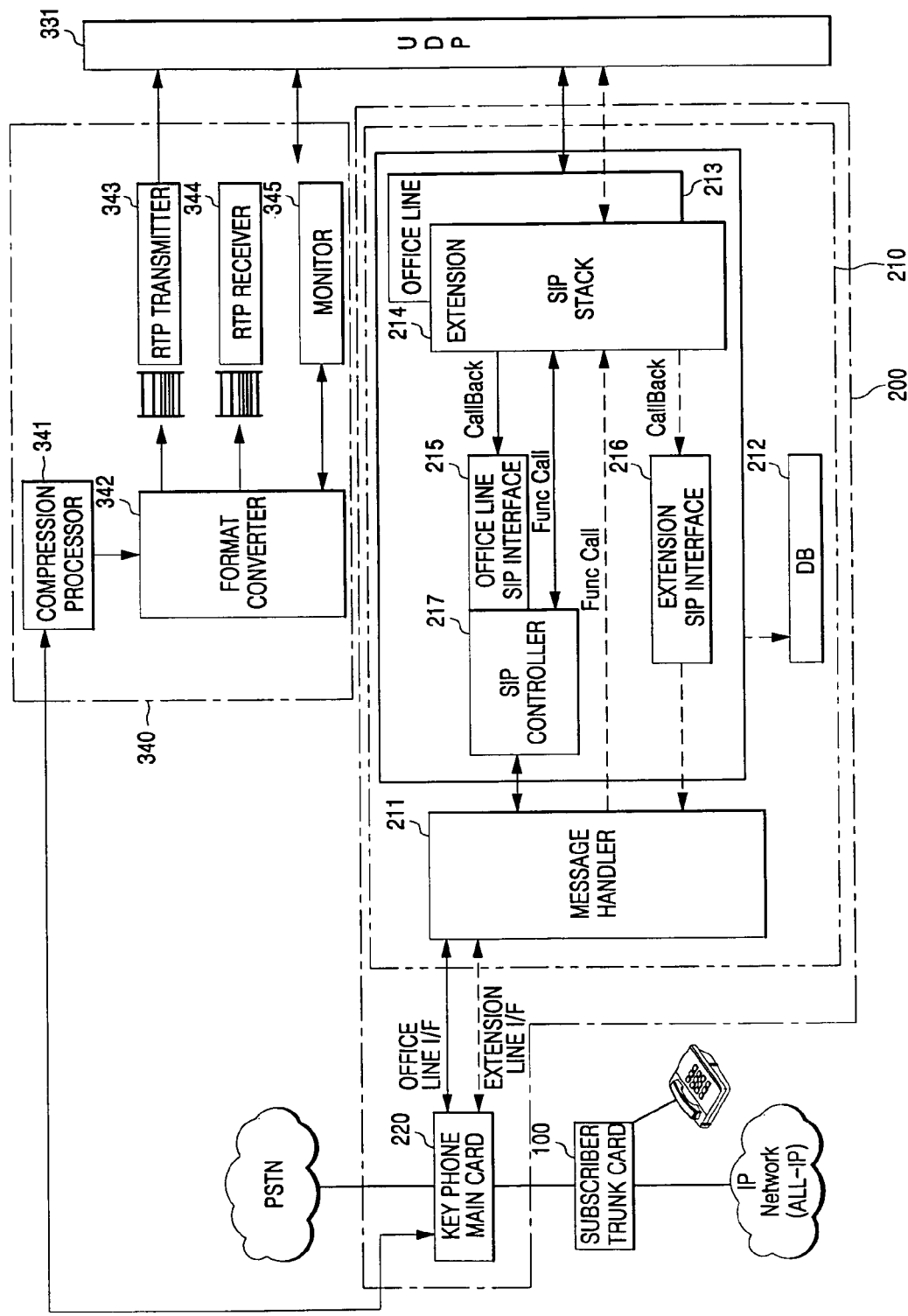
FIG. 5 is a detailed block diagram of an apparatus to process SIP signaling in a voice/data integrated switching system in accordance with an embodiment of the present invention.

FIG. 5 is a detailed block diagram of an apparatus to process SIP signaling in a voice/data integrated switching system in accordance with an embodiment of the present invention. Referring to FIG. 5, the VoIP voice compression codec 340 includes a compression processor 341, a format converter 342, Real Time Transport Protocol (RTP) transceivers 343 and 344, and a monitor 345.

The compression processor 341 converts a PCM coded voice signal inputted via the subscriber trunk card 100 into voice data packets, and then compresses the converted voice data packets using an established compression scheme, that is, an established transcoding card. The transcoding card can include a G.732.1 card of 5.3 kbps and 6 kbps, G.729 card of 8 kbps, and G.729A card.

Also, the compression processor 341 converts the data packets received via the IP network into the PCM coded voice signal, and provides the PCM coded voice signal to the corresponding subscriber terminal via the subscriber trunk card 100.

The format converter 342 adds header information to the voice data packets compressed in the compression processor 341 and performs format conversion. The header information can include at least one of IP address information, User Datagram Protocol (UDP) information and RTP information.

Also, the format converter 342 extracts header information of the voice data packets received via the RTP receiver 314, and then provides the compression processor 341 with the voice data packets.

The RTP transmitter 343 transmits the voice data packets whose format was converted in the format converter 342 to the IP network via the UDP 321 of the router 330 of FIGS. 3 and 4.

The RTP receiver 344 provides the format converter 342 with the voice data packets received via the UDP 331 using an RTP protocol.

Also, the monitor 345 monitors errors of the voice data packets or the like that are transceived via the RTP transmitter 343 and the RTP receiver 345, stores the monitored result, and then transceives error generated voice data packets once again using an SIP signaling process with the terminal via the SIP signaling processor 210.

As shown in FIG. 5, the SIP signaling processor 210 can include a message handler 211, a database (DB) 212, office line/extension SIP stacks 213 and 214, office line/extension SIP interfaces 215 and 216, and an SIP controller 217.

The SIP signaling processor 210 supports an office line SIP signaling processor and an extension SIP signaling processor. Both supports are discriminated by constructing a stack handler (not shown) using UDP ports different from one another when the office line/extension SIP stacks 213 and 214 are initialized.

The message handler 211 in the SIP signaling processor 210 interfaces an office line/extension call message received from a key phone main card 220 and a processing message between the key phone main card 220 and the SIP signaling processor 210. That is, it performs message format conversion for a message interface between the SIP and the private switch, i.e., a signaling conversion.

A method transmission in the SIP extension signaling is processed using a corresponding function call in the message handler 211.

Also, the corresponding function effects get/set of protocol information (SIP, Session Description Protocol (SDP) header parsing/generation function) needed to process the incoming method transmission from the IP network or incoming/outgoing SIP signaling.

The message handler 211 effects translations of an office line flow/an extension DGP flow/a proprietary message (other information) between the key phone main card 220 and office line SIP signaling processors 217, 215 and 213.

Figure 6:
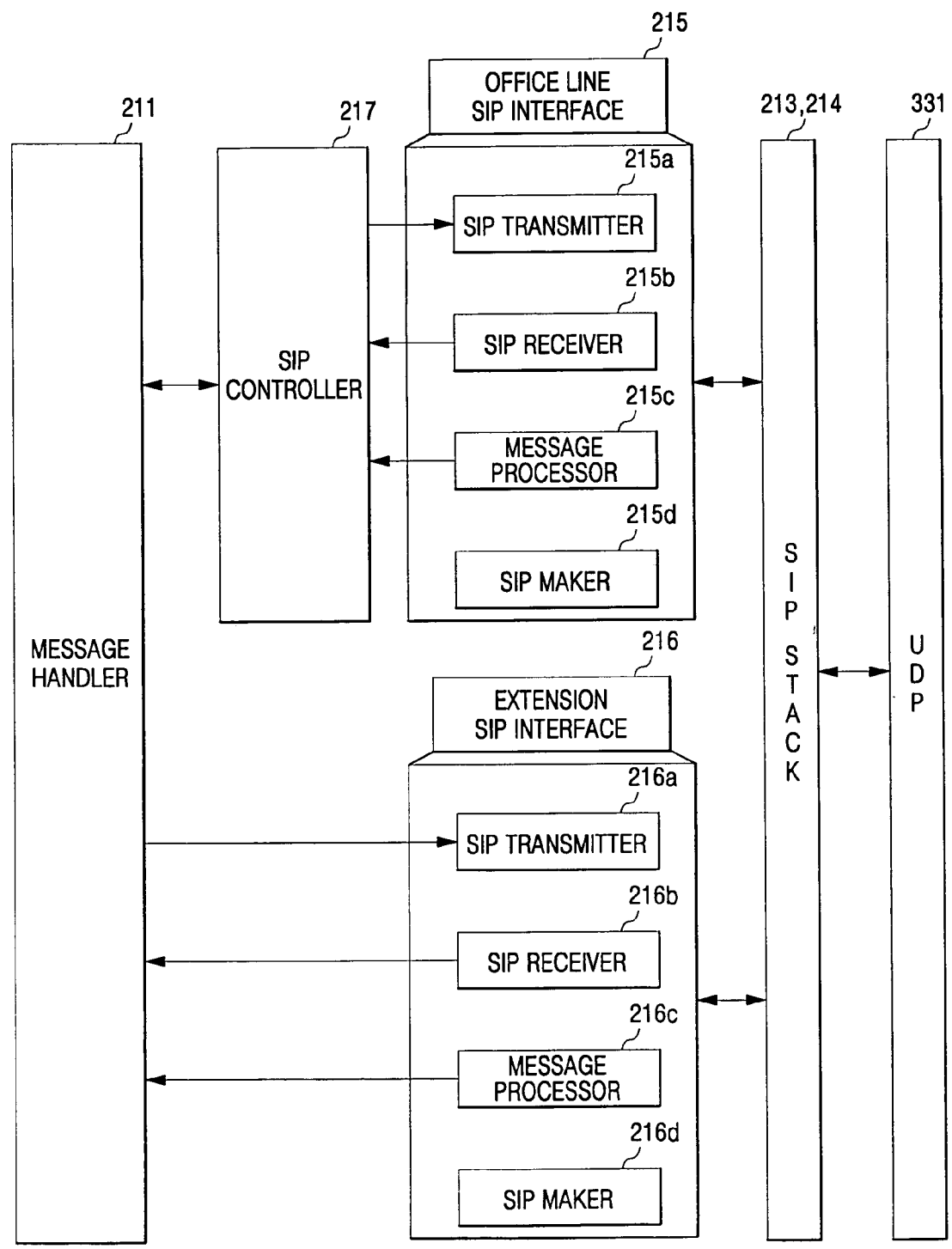
FIG. 6 is a block diagram of the office line and extension SIP interface of FIG. 5.

FIG. 6 is a block diagram of the office line and extension SIP interface of FIG. 5.

Referring to FIG. 6, the office line SIP interface 215 includes an SIP transmitter 215a, an SIP receiver 215b, a message processor 215c and an SIP maker 215d.

The SIP transmitter (SIP Send Function) 215a transmits an SIP method and status code to the IP network.

The transmission method transmitted from the SIP transmitter 215a is separately processed in two cases, i.e., one case in which the SDP has been received from a remote SIP system or a remote terminal (BuildBodyForRtp), and the other case in which the SDP has been transmitted for the first time (BuildBodyForFtpNew).

The SIP receiver (Recv Function) 215b processes the method and status code received form the office line SIP stack 213 and provides them to the message handler 211 via the SIP controller 217. The SIP receiver 215b obtains phone number information (Tel Number), port information (Port), codec information (Codec) and remote IP information to be transmitted to the SIP controller 217.

The SIP maker (SIP Make) 215d stores an originating terminal ID (Call ID) provided from the office line SIP stack 213 in a call working database (Call Working DB) of an idle channel and informs the office line SIP stack 213 of a working pointer of the idle channel.

The message processor (State Change Function) 215c processes the message to be transmitted to the SIP controller 217, which provides the SIP controller 217 with DSP capability information, phone number information, RTP port information, and the like.

As shown in FIG. 6, the extension SIP interface 216 can include an SIP transmitter 216a, an SIP receiver 216b, a message processor 216c, and an SIP maker 216d, and functions of these elements are the same as those of the office line SIP interface 215 described above.

However, each element of the extension SIP interface 216 is directly connected to the message handler 211 without passing through the SIP controller 217, and processes the signaling and message. That is, each element of the extension SIP interface processes the message that is directly transmitted to the message handler 211 without passing through the SIP controller 211.

Figure 7:
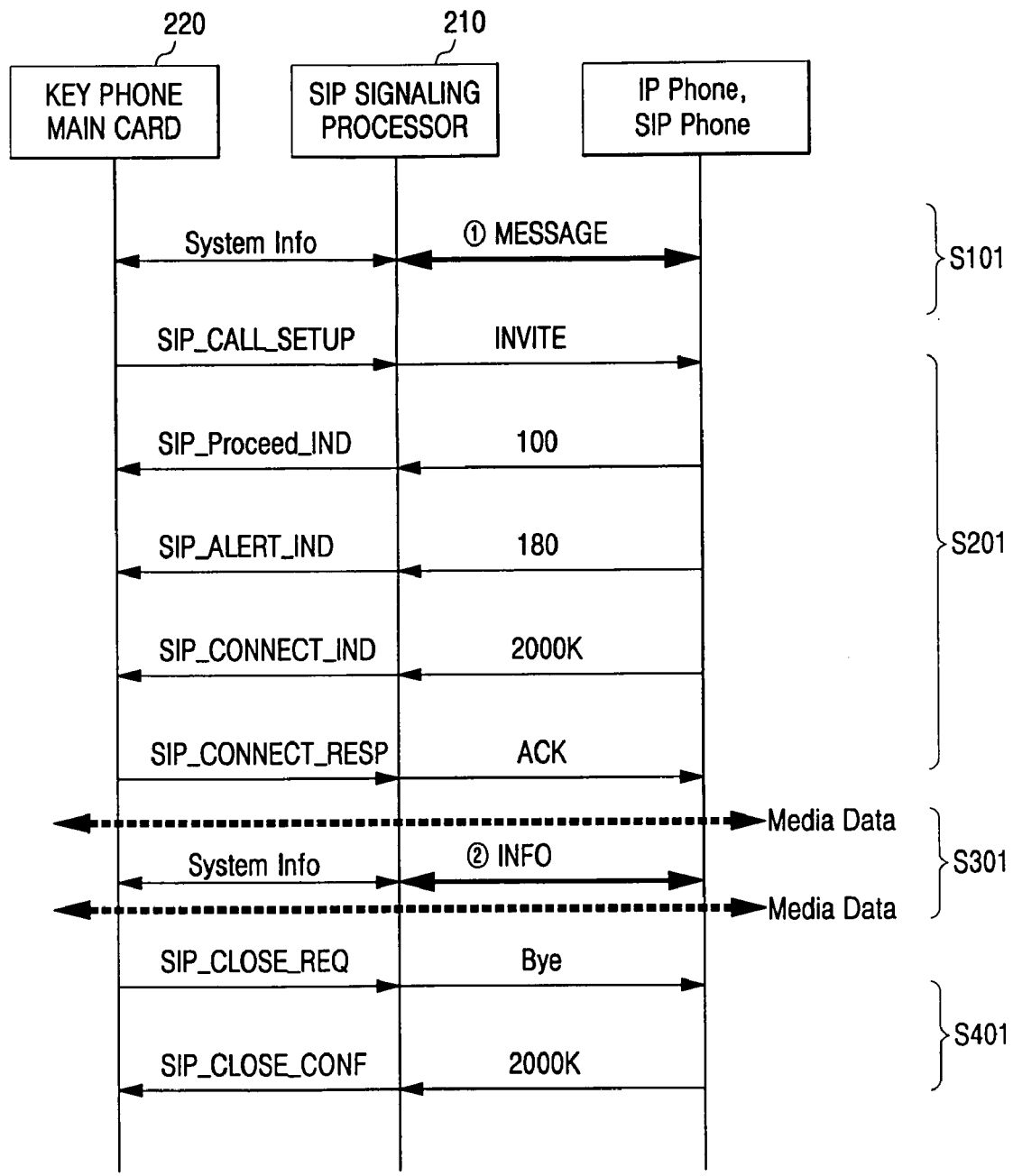
FIG. 7 is a view of a method of processing SIP interfacing signaling in a voice/data integrated switching system in accordance with an embodiment of the present invention.

FIG. 7 is a view of a method of processing SIP interfacing signaling in a voice/data integrated switching system in accordance with an embodiment of the present invention.

As shown in FIG. 7, the present invention has a signaling flow for a method for applying proprietary signaling used between a system and a terminal in an existing voice communication switching system to SIP standard signaling using a call signaling, a "MESSAGE" method, and an "INFO" method of a standard SIP.

As shown in FIG. 7, in step S101, a "MESSAGE" method that is transceived between an SIP signaling processor 210 and an IP terminal or a standard SIP terminal is a method used to realize an IM (Instant Message) service that is realized as a supplementary service in the VoIP, which is one of the SIP signaling that always provides a method capable of transmitting information useful to the other party regardless of a call setup.

By making use of such a feature, the voice communication switching system can transmit and receive a message or system information transmitted between a system, i.e., a key phone main card 220 and a terminal regardless of a call setup.

The SIP is characterized in that a user who uses and develops the signaling adds needed contents of signaling with ease based on the text, and then the proprietary signaling that was used-between the existing voice switching system and the terminal is encapsulated in the SIP signaling with ease.

Step S201 of FIG. 7 is a call setup procedure between the terminals via the key phone main card 220 and the SIP signaling processor 210. The step will be briefly described since it is the same as a general call setup procedure.

First, when an SIP call setup message (SIP_CALL_SETUP) is transmitted from the key phone main card 220 to the SIP signaling processor 210, the SIP signaling processor 210 requests a call setup by transmitting an "INVITE" message to an IP terminal or a standard SIP terminal.

The IP terminal or standard SIP terminal that received the "INVITE" message transmits a "100 Trying" message to the SIP signaling processor 210, and the SIP signaling processor 210 transmits an "SIP_Proceed_IND" message to the key phone main card 220. The "100 Trying" message is a message indicating that a processing operation to effect a call setup is in progress, that is, a call proceeding message.

When such a "100 Trying" message is transmitted and then the processing operation to effect a call setup has been completed, the IP terminal and standard SIP terminal transmit a "180 Trying" message to the SIP signaling processor 210. The "180 Trying" message is a Ring Back Tone message.

Subsequently, the SIP signaling processor 210 transmits an "SIP_ALERT_IND" message to the system, i.e., the key phone main card 220 according to the "180 Trying" message received from the terminal. Accordingly, the user's terminal (an extension or office line terminal) hears a ring back tone signal indicating call connection.

Also, when the user hooks off while the IP terminal or standard SIP terminal was generating the ring back tone signal; the terminal transmits a "200OK" message to the SIP signaling processor 210, and the SIP signaling processor 210 informs that a call is connected between the terminals by transmitting an SIP_CONNECT_IND message to the key phone main card 220.

And then, the key phone main card 220 that received the SIP_CONNECT_IND message from the SIP signaling processor 210 transmits an "SIP_CONNECT_RESP" message being a response message to the SIP signaling processor 210, and the SIP signaling processor 210 transmits an "ACK" message being a response message for the call connection to the IP terminal or standard SIP terminal, so that a voice communication (VoIP) between the terminals is accomplished.

As such, while the call is connected between the terminals to accomplish the voice communication, the transmission of the SIP message and other information is accomplished through an "INFO" method.

That is, while a communication is performed between the terminals, such as step S301 of FIG. 7, the transmission of the message and information between the key phone main card 220 and the IP terminal or standard SIP terminal in the voice communication switching system can be accomplished using the "INFO" method.

That is, although the "INFO" method in step S301 is mainly used for the purpose of processing a Dual-Tone Multi Frequency (DTMF) that is transmitted on busy, there is a merit that the user can reestablish a payload type of the signaling and freely use it, so that the DTMF and the proprietary signaling that was used when the system communicates with the terminal can be separately processed.

Also, step S401 of FIG. 7 is a call setup release step. That is, when the key phone main card 220 transmits an "SIP_CLOSE_REQ" call setup release request message to the SIP signaling processor 210, the SIP signaling processor 210 transmits a "Bye" message to an IP phone or a standard SIP phone.

Accordingly, the IP phone or standard SIP phone transmits a "200OK" message indicating communication termination to the SIP signaling processor 210, and the SIP signaling processor 210 transmits an "SIP_CLOSE_CONF" message to the key phone main card 220, so that the setup call is released, i.e., the communication is terminated.

Accordingly, the proprietary signaling used between the existing system and the terminal can be processed together with signaling with the standard SIP phone. It is solved when the standard signaling and the proprietary signaling used between the system and the terminal are separately used by setting the SIP signaling port separately. That is, for example, the standard SIP signaling can use a 5060 port and the proprietary signaling used between the system and the terminal can use another port.

The above described method is used to transmit the message and other data to the terminal, which is a transmission scheme using a standard SIP protocol.

In the apparatus and method for processing SIP signaling in a voice/data integrated switching system in accordance with the present invention as described above, a router, a data switch and a voice switch device are integrated as one so that it is easy to install the system, it is possible to operate and maintain the system integrally, it is possible to use a conventional voice terminal or a public telephone network interface module, and it is possible to effect voice communication over the Internet and various multimedia data services as well as an existing voice communication.

Also, call signaling between the voice/data integrated switching system and the terminal is processed using standard VoIP SIP signaling, a message that is periodically switched between the switch system and the terminal and a message switched on busy except for the call signaling are networked using a "MESSAGE" method and an "INFO" method of VoIP SIP signaling, and the VoIP standard SIP signaling accepts functions of various communication switch system already realized between the voice switching system and the terminal, so that it is easy to interface with an All IP-based communication system and it is possible to create a service in connection to a supplementary service realized in NgN.

While the present invention has been described with reference to exemplary embodiments thereof, it will be understood by those skilled in the art that various modifications in form and detail can be made therein without departing from the scope of the present invention as defined by the following claims.

What is claimed is:

1. A method for processing session initiation protocol (SIP) signaling in a voice and data integrated switching system, the method comprising:

transceiving a message and data between a terminal and a system using a Voice over Internet Protocol (VoIP) SIP "INFO" method upon communication being performed between the terminal and a second terminal via an Internet Protocol (IP) network and using a VoIP SIP "MESSAGE" method in an idle state if communication is not being performed between the terminal and the second terminal;

processing proprietary signaling of a legacy voice switching system as standard signaling using standard VoIP SIP signaling; and simultaneously and separately processing the standard VoIP SIP signaling and the proprietary signaling of the legacy voice switching system in a system using the VoIP SIP signaling, wherein the steps of transceiving, processing, and simultaneously and separately processing are done by a single voice and data processing module, wherein the voice/data integrated switching system is configured to convert a Pulse Code Modulation (PCM)-coded voice signal from a PCM bus into voice data packets and to compress the converted voice data packets using an established compression scheme by the single voice and data processing module, and wherein simultaneously and separately processing the standard VoIP SIP signaling and the proprietary signaling of the legacy voice switching system, comprises:
interfacing a communication of the standard VoIP SIP signaling with the second terminal in separation into an office line and an extension;
performing format conversion of the communication through the office line and extension session initiation protocol interfaces;
communicating the format-converted communication through the office line and extension session initiation protocol interfaces between the second terminal and the system using a MESSAGE method in a state in which a communication is not performed between the terminal and the second terminal, and using an INFO method in a state in which a call connection is performed between the terminal and the second terminal.

2. A voice and data integrated switching system, comprising: a session initiation protocol (SIP)-supported Internet protocol (IP) terminal; a Voice over Internet Protocol (VoIP) voice compression CODEC to convert a Pulse Code Modulation (PCM)-coded voice signal from a first network to a compressed voice data packet, to convert voice data packets from a second network into a PCM-coded voice signal, and to output the converted signal to the first network;
a control module to switch and route the voice data packets converted and compressed by the VoIP voice compression CODEC, from the first network, to the second network according to established routing information and to provide the voice data packets received from the second network to the VoIP voice compression CODEC;
a router to switch the voice data packets received from the second network to the control module and the voice data packets routed from the control module to a corresponding network interface; and
a session initiation protocol signaling process unit to connect call signaling to the Internet protocol (IP) terminal using session initiation protocol signaling, to allow messages except call signaling that are switched with the Internet protocol terminal to support proprietary signaling and a session initiation protocol-based signaling, and to allow each signaling to separately set and process a session initiation protocol signaling port,
wherein the VoIP voice compression CODEC, the control module, and the router are all contained in a single voice and data processing module, and
wherein the session initiation protocol signaling process unit comprises:
an office line session initiation protocol interface and an extension session initiation protocol interface to interface a communication of the voice over Internet protocol session initiation protocol signaling message with the IP terminal in separation into an office line and an extension; and
a message handler to perform format conversion of the session initiation protocol signaling message communicated through the office line and extension session initiation protocol interfaces for an interface between the session initiation protocol signaling process unit and the router, and to communicate the format-converted session initiation protocol signaling message through the office line and extension session initiation protocol interfaces between the IP terminal and the system using a MESSAGE method in a state in which a communication is not performed between the IP terminal and a second terminal, and using an INFO method in a state in which a call connection is performed between the IP terminal and the second terminal.

3. The system according to claim 2, wherein the session initiation protocol signaling process unit enables a voice over Internet protocol session initiation protocol signaling message to be communicated between the IP terminal and the system using a voice over Internet protocol session initiation protocol "MESSAGE" method in an idle state in which a communication is not performed between the IP terminal and the second terminal through an Internet protocol network, and enables the voice over Internet protocol session initiation protocol signaling message to be communicated between the IP terminal and the system using a voice over Internet protocol session initiation protocol "INFO method in a state in which a call connection is performed between the IP terminal and the second terminal through the Internet protocol network.

4. The system according to claim 2, wherein the office line session initiation protocol interface comprises:
a session initiation protocol transmitter to transmit a session initiation protocol (SIP) method and a status code to an Internet protocol network, to separately process the transmitted SIP method into a case that a Session Description Protocol (SDP) is previously received from a remote session initiation protocol system or a remote terminal and a case that the SDP is transmitted for the first time;
a session initiation protocol receiver to obtain terminal information from a session initiation protocol method and a status code received from an office line session initiation protocol stack, and to provide the message handler with the obtained information;
a session initiation protocol maker to store an originating terminal identity (ID) received from the office line session initiation protocol stack in a call working database of an idle channel and to provide the office line session initiation protocol stack with call working point information of the idle channel; and
a message processor to provide the message handler with the terminal information obtained from the session initiation protocol receiver to process the session initiation protocol signaling message using the corresponding information.

5. The system according to claim 2, wherein the extension session initiation protocol interface comprises:
a session initiation protocol transmitter to transmit a session initiation protocol method and a status code to the Internet protocol network;
a session initiation protocol receiver to obtain extension terminal information from a method and a status code received from an extension session initiation protocol stack, and to provide the message handler with the obtained information;
a session initiation protocol maker to store an originating extension terminal identity (ID) received from the extension session initiation protocol stack in a call working database of an idle channel, and to provide the extension session initiation protocol stack with call working point information of the idle channel; and
a message processor to obtain extension terminal information using the method and the status code received from the session initiation protocol receiver, to provide the message handler with the obtained terminal information, and to process the extension session initiation protocol signaling message using corresponding information.

6. The system according to claim 2, wherein the session initiation protocol extension signaling method transmission in the message handler is processed with a function call which makes GET/SET of protocol information needed to process a method or incoming/outgoing session initiation protocol signaling that is received from the Internet protocol network, wherein the protocol information comprises SIP and Session Description Protocol (SDP) header parsing and generation information.

7. The method according to claim 1, wherein said voice and data integrated switching system converts voice data packets from the IP network into a PCM-coded voice signal and provides said PCM-coded voice signal to the corresponding subscriber terminal.

8. A voice and data processing module, comprising; a dual port memory to store a signaling message;

a memory storing various databases comprising routing information, subscriber information, and programs to drive a router;

the router comprising interfaces to transmit a voice data packet to an Internet and to provide the voice data packet to a local area network (LAN) switch and a Voice over Internet Protocol (VoIP) voice compression codec;

the VoIP voice compression codec to convert a Pulse Code Modulation (PCM)-coded voice signal provided from a Time Division Multiplexing (TDM) switching module through a PCM serial bus into an Internet Protocol (IP) voice data packet, to compress the converted data packet, to transmit the compressed data packet to the IP network through the router, to convert a voice data packet received through the IP network into a PCM voice signal, and to provide the TDM switch module with the converted signal through the PCM serial bus;

a security processor to connect to the router through a Peripheral Component Interconnect (PCI) bus, and to realize a tunneling function in hardware through encryption, decryption, and authentication to construct a virtual private LAN;

the LAN switch to transmit the voice data packet transmitted from the router through the interfaces corresponding to a terminals;

a session initiation protocol signaling process unit to connect call signaling to the IP terminal using session initiation protocol signaling, to allow messages except call signaling that are switched with the Internet protocol terminal to support proprietary signaling and a session initiation protocol-based signaling, and to allow each signaling to separately set and process a session initiation protocol signaling port, and wherein the session initiation protocol signaling process unit comprising:

an office line session initiation protocol interface and an extension session initiation protocol interface to interface a communication of a voice over Internet protocol session initiation protocol signaling message with the terminal in separation into an office line and an extension; and a message handler to perform format conversion of the session initiation protocol signaling message communicated through the office line and extension session initiation protocol interfaces for an interface between the session initiation protocol signaling process unit and the router, and to communicate the format-converted session initiation protocol signaling message through the office line and extension session initiation protocol interfaces between the terminal and the module using a voice over Internet protocol session initiation protocol "MESSAGE" method in an idle state in which a communication is not performed between terminals through an Internet protocol network, and using a voice over Internet protocol session initiation protocol "INFO method in a state in which a call connection is performed between the terminals through the Internet protocol network, the terminals comprising a second terminal.

9. The voice and data processing module according to claim 8, wherein the dual port memory comprises a first port and a second port, the first port comprises a storing port and the second port comprises a reading port.

10. The voice and data processing module according to claim 8, wherein the memory comprises a random access memory (RAM) and a flash memory.

11. The voice and data processing module according to claim 8, wherein the interfaces comprise a V.35 transceiver to transceive the data packet through a wide area network (WAN) serial port, and wherein the interfaces transceive the data packet through a digital subscriber line (xDSL) or a cable modem and provide the LAN switch with a path of the data packet.

12. The voice and data processing module according to claim 8, wherein a security processor carries out the transceived voice/data packet encapsulation or decapsulation.

13. The voice and data processing module according to claim 8, wherein the session initiation protocol signaling process unit connects call signaling to an Internet protocol terminal using session initiation protocol signaling, allows messages except call signaling that are switched with the Internet protocol terminal to support proprietary signaling and a session initiation protocol-based signaling, and allows each signaling to separately set and process a session initiation protocol signaling port.

\* \* \* \* \*